(12) United States Patent
Vitt

(10) Patent No.: US 8,322,600 B2
(45) Date of Patent: Dec. 4, 2012

(54) ASSEMBLY FOR REINFORCEMENT FOR CONCRETE AND MARKERS

(75) Inventor: Gerhard Vitt, Pfungstadt (DE)

(73) Assignee: NV Bekaert SA, Zwevegem (BE)

( * ) Notice: Subject to any disclaimer, the term of this patent is extended or adjusted under 35 U.S.C. 154(b) by 282 days.

(21) Appl. No.: 12/679,364

(22) PCT Filed: Sep. 29, 2008

(86) PCT No.: PCT/EP2008/063008
§ 371 (c)(1),
(2), (4) Date: Mar. 22, 2010

(87) PCT Pub. No.: WO2009/043833
PCT Pub. Date: Apr. 9, 2009

(65) Prior Publication Data
US 2010/0219236 A1 Sep. 2, 2010

(30) Foreign Application Priority Data
Oct. 2, 2007 (EP) .................................. 07117733

(51) Int. Cl.
*G06F 17/00* (2006.01)
(52) U.S. Cl. .................... 235/375; 428/297.4; 428/298.1
(58) Field of Classification Search .................. 235/375; 428/297.4, 298, 298.1, 364
See application file for complete search history.

(56) References Cited

U.S. PATENT DOCUMENTS

| | | |
|---|---|---|
| 4,121,943 A | 10/1978 | Akazawa et al. |
| 4,284,667 A | 8/1981 | Moens |
| 5,285,930 A | 2/1994 | Nielsen |
| 6,945,686 B2 | 9/2005 | Dewinter |
| 2002/0110680 A1* | 8/2002 | Bank et al. .................. 428/297.4 |
| 2005/0095424 A1 | 5/2005 | Thompson |
| 2006/0170535 A1* | 8/2006 | Watters et al. ............. 340/10.41 |

FOREIGN PATENT DOCUMENTS

| | | |
|---|---|---|
| DE | 3412216 A1 | 10/1985 |
| DE | 4427156 A1 | 2/1996 |
| DE | 29714704 U1 | 10/1997 |
| EP | 0499573 A1 | 8/1992 |
| EP | 0522029 B1 | 1/1993 |
| EP | 0499572 B1 | 10/1997 |
| FR | 2672045 A1 | 7/1992 |
| JP | 8-209938 A | 8/1996 |
| JP | 2000-91963 A | 3/2000 |
| JP | 2005-330729 A | 12/2005 |

OTHER PUBLICATIONS

Manfred Helmus et al., "Baustellenkoordination Mit Radio Frequency Identification (RFID)", Baumarkt + Bauwirtschaft, Bauverlag, Aug. 14, 2006, pp. 29-31.

* cited by examiner

*Primary Examiner* — Thien M Le
(74) *Attorney, Agent, or Firm* — Foley & Lardner LLP

(57) ABSTRACT

The invention relates to an assembly of fibers (12) for concrete with RFID markers (10) or any other type of marker which can provide the information "I am here" and to a concrete or concrete structure (22) comprising fibers for reinforcement or any other purposes with RFID markers. The invention also relates to a method for determining the type and amount of fibers for the manufacturing of fiber concrete and to a method for determining the type, content and/or distribution of fibers within a fiber concrete with the help of the RFID markers.

18 Claims, 2 Drawing Sheets

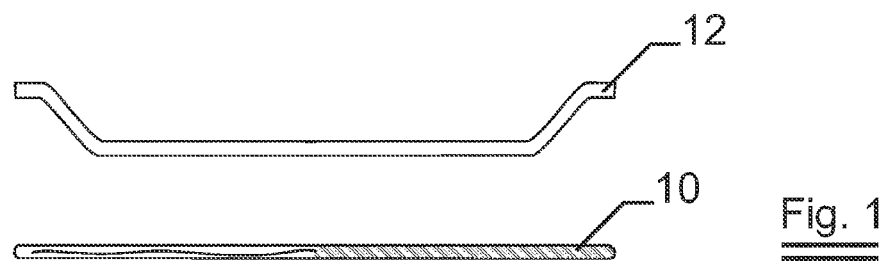
Fig. 1
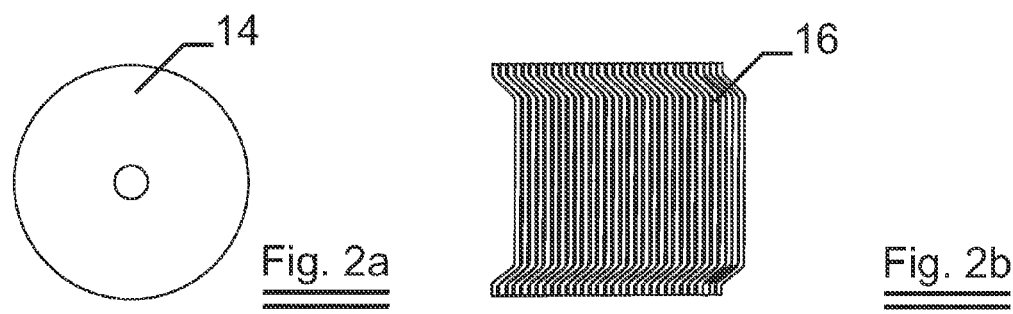
Fig. 2a
Fig. 2b
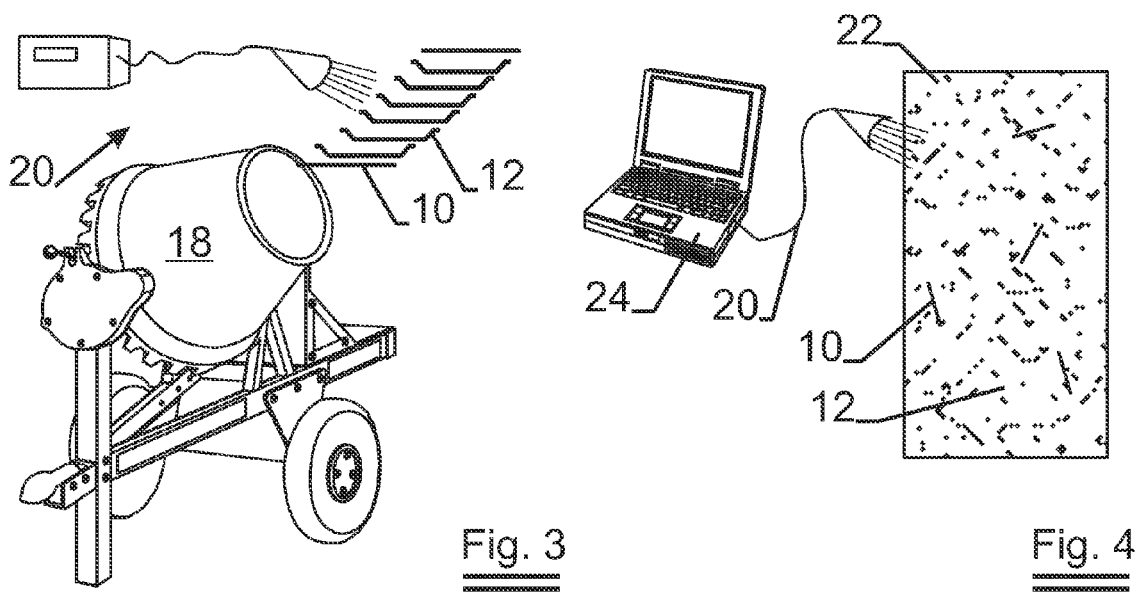
Fig. 3
Fig. 4
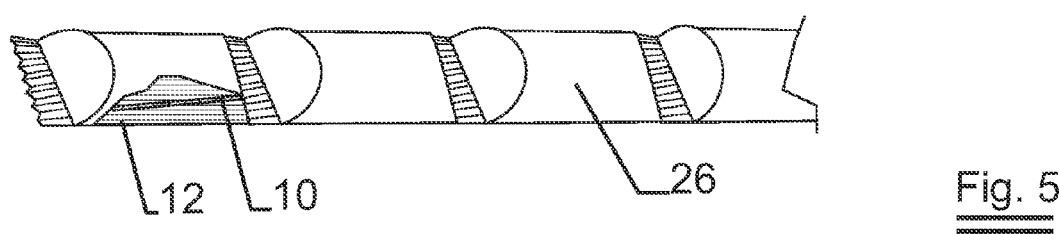
Fig. 5

ASSEMBLY FOR REINFORCEMENT FOR CONCRETE AND MARKERS

TECHNICAL FIELD

The invention relates to a method for determining the amount of fibres for the manufacturing of fibre concrete and to a method for determining the content and/or distribution of fibres within a fibre concrete. The invention also relates to an assembly of fibres for concrete and to a concrete structure comprising fibres for reinforcement.

BACKGROUND ART

For the manufacturing of fibre concrete, or concrete reinforced with reinforcing fibres, it is extremely important to supply or dose the exact quantity of reinforcing fibres to the mixture of components of mortar or concrete. Once integrated in the concrete, the fibres also need to have a homogeneous distribution to assure a correct reinforcement and quality.

Numerous solutions have already been proposed, such as in EP-A-522.029 (WO 91/14551); EP-A-499.572; EP-A-499.573; DE 29714704U; DE-A-3.412.216; DE-A-4.427.156; FR-A-2.672.045, U.S. Pat. No. 4,284,667 and U.S. Pat. No. 6,945,686 and many other patent documents.

Despite the existence of a lot of solutions to supply the exact amount and type of fibres into concrete and to improve homogeneity of distribution of fibres into concrete, there is still a need to further improve dosing and distribution of fibres in concrete.

Another disadvantage of the existing situation is that once the fibres are in the concrete, fresh or hardened, it is difficult to control the quality of the fibre reinforced concrete, i.e. not only the right type and quantity of fibres that have been used, but particularly the actual fibre distribution within the concrete. Wash-out tests are carried out on site to ensure that the correct amount of reinforcing fibres has been dosed into the concrete and distributed homogeneously. This is time consuming, requires special equipment and might deliver results too late.

Non-destructive magnetic field testing apparatus exists, but this requires pouring concrete in a mould. For a hardened concrete structure, this still involves drilling a core out of the structure. These tests are however limited to steel fibres and there is no continuous measurement possible. Non-steel fibres, such as e.g. polypropylene fibres, are being used more and more extensively as reinforcement for concrete and other structures. There exists an urgent need for control mechanisms to check the correct type, amount and distribution of steel and non-steel reinforced concrete, even when the concrete structure has been there for years.

JP2005-330729 discloses the use of a radio IC tag to provide information about a concrete member so that said information is not lost or does not hinder the appearance and the workability of the concrete member. Since the tag may deteriorate over years and may produce a malfunction, two or more tags are applied underground in a concrete member. The tags may also be fixed to a steel rod placed in the concrete. However, said tags are used solely for the purpose of providing information about the concrete member as such. The information is pre-stored on the tag, meaning that the proportioning and/or mixture ratio is stored as information on the tag, but does not provide any guarantee or examining about the actual proportioning or mixing ratio in the concrete.

It is a particular purpose of the present invention to provide information about a fibre reinforced concrete post-mixing and/or post-hardening.

The invention intends to avoid aforementioned disadvantages.

It is an object of the invention to provide intelligence to fibre reinforced concrete and fiber reinforced concrete structures.

It is also an object of the invention to provide a simple method for dosing fibres in concrete.

It is another object of the invention to provide a method for determining the content and quality of concrete reinforcement, such as the amount of fibres, origin, distribution, concentration and/or type of fibres.

DISCLOSURE OF INVENTION

The invention relates to an assembly of reinforcement for concrete and one or more markers, e.g. RFID markers. The marker contains at least the "I am here" information. Within the general context of the present invention a suitable marker is a marker with at least the "I am here" information.

The invention further relates to a concrete or concrete structure comprising fibres and one or more RFID markers.

The invention also relates to a method for determining the amount of fibres for concrete, comprising the steps of: a) providing an assembly of fibres and one or more RFID markers or any other suitable markers, wherein the amount of RFID markers is indicative for the amount of fibres, e.g. is in proportion to the amount of fibres; b) providing a reader device for reading said RFID markers; c) counting the amount of RFID markers; and d) proportioning backwards to determine the amount of said fibres.

The invention also relates to a method for determining the amount of fibres in concrete or a concrete structure, comprising the steps of: a) providing a concrete or concrete structure comprising an assembly of fibres and one or more RFID markers, wherein the amount of said RFID markers is indicative for the amount of said fibres, e.g. is in proportion to the amount of said fibres; b) providing a reader device for reading the RFID markers in said concrete structure; c) counting the amount of RFID markers; and d) proportioning backwards said amount to determine the amount of said fibres.

The invention further relates to a method for determining the distribution of fibres in a concrete or concrete structure, said method comprising the following steps: a) providing a concrete or concrete structure comprising an assembly of fibres and one or more RFID markers, wherein the amount of said RFID markers is in proportion to the amount of said fibres; b) providing a reader device for reading the RFID markers in said concrete structure; c) determining the distribution of RFID markers; and d) proportioning backwards said distribution to determine the distribution of fibres.

The invention still further relates to a method for identifying the fibres in a concrete or concrete structure, comprising the steps of: a) providing a concrete or concrete structure comprising an assembly of fibres and one or more RFID markers, wherein said RFID markers carry information about said fibres; b) providing a reader device for reading the information on one or more of said RFID markers in said concrete structure; and c) identifying said fibres on the basis of said information.

The RFID markers may also carry information about the history of the fibres: when and where they have been manufactured so that quality control can be automated and complaints can be traced back.

The markers used in the present invention comprise information not solely about the concrete member as such, but particularly about the reinforcing fibres and the position/distribution of said fibres in the concrete. Said information can be explicit (e.g. type of fibre, . . . ) or inherent (the distribution or position of the markers determine the distribution or positions of the fibres in the concrete, considering that the fibres and the markers are in amount in relation to each other).

In prior art systems like e.g. JP2005-330729, contrary to the present invention, the proportioning and/or mixture ratio may be stored as information on the tag, whereas the present invention distributes RFID markers into the concrete mixture so that the presence/position/distribution of markers is an actual measure for the presence/position/distribution of fibres in the concrete. A simple "I am here" information on the RFID markers suffices to indicate the position/distribution of said markers. Given that the markers are dispersed in the concrete in a similar manner as the reinforcement fibres, the markers are a measure for the distribution of the fibres in the reinforced concrete.

The tags of prior art systems are not dispersed in the concrete member in a controlled distributed manner, nor do they serve the purpose as described above.

The fibres in reinforced concrete need to have a homogeneous distribution to assure a correct reinforcement quality. The effect of the RFID markers of the present invention is that the quality of the mixture can be checked in real-time, e.g. while pouring, and also non-destructively, i.e. after the concrete is laid down. This can be achieved by checking the preferable homogeneous distribution of the RFID markers in the concrete, and not as such the information on the markers. Bad concrete members can hereby immediately be identified, removed and laid again. In the most simple case, the RFID markers only contain the information e.g. "1" meaning "I am here". The present RFID markers comprise information about the fibres, and not solely about the concrete as in prior art systems.

The term "concrete structure" relates to concrete structures as such, but also to concrete which has not yet been cast at its final (cast on site) or intermediate (precast plant) position. In one example, the concrete structure is the concrete mixture within a truck. This is after concrete production but before a structure is made out of it. So the term concrete structure also comprises non-cured concrete.

BRIEF DESCRIPTION OF FIGURES IN THE DRAWINGS

FIG. 1 shows an example of an RFID marker with the same L/D ratio as a fibre.

FIG. 2a shows another example of an RFID marker with the same L/D ratio as glued fibres shown in FIG. 2b.

FIG. 3 shows an embodiment of a method according to the invention for determining the amount of fibres.

FIG. 4 shows an embodiment of a method according to the invention for determining the content and/or distribution of fibres in a concrete structure comprising the assembly according to the invention.

FIG. 5 shows an example of a chain package comprising the assembly according to the invention.

FIG. 6 shows the unloading of concrete from a truck, whereby a reader device detects the content of RFID markers and fibres within the concrete.

MODE(S) FOR CARRYING OUT THE INVENTION

It is an object of the invention to provide an assembly of reinforcement for concrete and one or more markers. The markers may be distributed or dispersed in said concrete along with said fibres, whereby the presence of said markers can determine the amount and/or distribution of said fibres in said concrete. In one embodiment the fibres have reinforcing properties, as e.g. for concrete reinforcement in a fibre reinforced concrete.

The invention is also suitable for fibres which improve other properties of the concrete including but not limited to shrinkage at early concrete age, fire resistance and impact resistance. Furthermore the invention is suitable for steel or non-steel fibres or other elements which improve properties of any structure.

The fibres of the invention may be any fibre made of steel, non-steel or a combination of both. Typically this involves fibres made of steel, polymers, carbon, PVA, glass etc.

By way of example said fibres could be DRAMIX® fibres for reinforcement of concrete produced and sold by the applicant. U.S. Pat. No. 6,945,986 by applicant discloses an assembly of fibres for concrete.

Steel fibres for concrete reinforcement typically have a length ranging from 3 mm to 60 mm, a thickness typically ranging from 0.08 mm to 1.20 mm and a tensile strength greater than 800 MPa, e.g. greater than 1200 MPa, e.g. greater than 2000 MPa. The steel fibre is preferably provided with anchorages for mechanically anchoring the fibre in concrete. The length-to-thickness ratio typically ranges between 40 and 200. The concentration of fibres in concrete may range from 10 kg/m$^3$ to 80 kg/m$^3$ or even higher amount for special applications or concretes like ultra high performance concretes.

The term "thickness" of a steel fibre refers to the smallest cross-sectional dimension of a straight steel fibre without the anchorages.

The term "anchorage" refers to any deviation from a straight steel fibre with a uniform transversal cross-section where the deviation helps to improve the anchorage of the steel fibre in concrete. The fibre can be undulated or can have hooked and/or deformed ends.

The steel fibres may or may not be provided with a metallic coating such as brass or zinc or an organic coating such as polyamide or with an anorganic coating or a combination of a metallic coating with a polymeric coating thereon.

Next to steel fibres, non-steel fibres may be used in concrete, either alone or in combination with steel fibres. Examples of these fibres are glass fibres, carbon fibres, aramid fibres, synthetic polymers (e.g. polyeolefin, polyester, polyamide, polyimide, polypropylene or polysulfone). For example, synthetic polymer fibres may be bundled together and wrapped by means of a dispersible shrink wrap material such as disclosed in e.g. WO-A-94/25702. The present invention is especially suited for examining the distribution of non-steel fibres within a structure.

Fibres may be used in matrixes such as e.g. in concrete, mortar, plaster or asphalt. The fibres are mixed with the concrete, mortar, plaster or asphalt for reasons such as e.g. reinforcement or fire protection. It is a general requirement that the fibres are distributed homogeneously and with a known content or ratio in the structures as exemplified above.

Fibres according to the invention may also comprise any shape or L/D ratio, like circular or triangular fibres, fibres in the shape of a zigzag, meshed fibres or fibre clusters or any other shape of fibres suitable for use as reinforcement in a concrete or concrete structure.

In another embodiment concrete reinforcement assemblies may comprise reinforcing structures other than fibres, such as steel bars/mesh, pre-stressing or post-tensioning cables. The RFID markers according to the invention may then be used to detect the presence of said reinforcement, meaning in the simplest case "I am here" information, either by proximity of position within the concrete, or just the presence, or the amount or distribution of such reinforcement within a concrete structure. Such an application can be useful e.g. where the reinforced concrete needs to be handled further and one does not want to be hindered by steel reinforcement. Locating the position of steel reinforcement within a concrete structure is very useful in all kinds of applications. One or more RFID markers may be placed along e.g. a steel rod to determine its exact position within a concrete structure.

The RFID markers may also be used in combination with grid shaped reinforcement strips or reinforcement clips for reinforcing horizontal or vertical masonry joints such as disclosed in EP-B1-0719366 or in EP-B1-1528176.

Markers are preferably RFID markers.

RFID or Radio-Frequency IDentification is an automatic identification method, relying on storing and remotely retrieving data using devices called RFID markers, tags or transponders.

Automatic identification and Data Capture (AIDC) refers to the methods of automatically identifying objects, collecting data about them, and entering that data directly into computer systems i.e. without human involvement. Technologies typically considered as part of AIDC also include barcodes. AIDC is also commonly referred to as "Automatic Identification," "Auto-ID," and "Automatic Data Capture". RFID is becoming a standard in automated data collection, identification and analysis systems worldwide.

RFID has become an accepted technology in areas such as logistics, labeling, security and production control. First applications can be found in the building industry whereby this technology is used to replace delivery notes by RFID markers which are mixed into the concrete.

The term "RFID marker" means any RFID tag, transponder or any type of other marker which is an automatic device that transmits a (predetermined) message in response to a (predefined) received signal according to the RFID technology mentioned above. RFID markers according to the invention may also transmit continuous signals to be captured by any receiver.

The term "RFID marker" is to be understood very broadly as any other suitable marker having the capability to at least send out a signal by which the presence ("I am here") or position of said marker can be detected. This is also referred to as "1/0" or "on/off" information. The term includes radio-frequency identification markers, wireless chips, magnetic materials, or any kind of very small device that can be incorporated into e.g. a concrete structure and that can be detected in a comfortable read range from the exterior of said concrete structure. The term "RFID marker" can also mean a combination of said markers, e.g. RFID markers to allow identification and soft magnetic wire to allow determining amount and distribution.

A tag would typically be glued or fixed on a fibre or another substrate while this is not necessarily the case with a marker.

An RFID marker can contain any kind information which can be read out by electromagnetic radiation.

RFID markers can be applied to or incorporated into a product for the purpose of identification using radiowaves.

Passive RFID markers are cheaper than active markers and require no maintenance. Due to the lack of onboard power supply RFID markers can be quite small and as such are very suited for the methods of the invention.

An RFID marker chip contains non-volatile storable data. Markers can be read from several meters away depending on the frequency and environment and beyond the line of sight of the reader.

There is however no global standard yet on frequencies used for RFID technology. Therefore it may be necessary for the methods of the invention to use different types of RFID markers depending on the country where they will be used.

RFID markers may be promiscuous, attending all requests alike, or secure, which requires authentication and control of typical password management and secure key distribution issues. A marker may as well be prepared to be activated or deactivated in response to specific reader commands.

The information stored on an RFID marker can be configured in different ways: read-only, write-once-read-many and read-write. Markers may also have the ability to monitor, measure and record numerous environmental conditions when combined with a sensing device.

Retrieved data can either be interpreted realtime or can be stored on a computer device. Retrieved data (e.g. a data ID) can also be used to link to further information to be looked up via internet or specialised databases.

In one embodiment the RFID markers carry basic information that allow the detection of the marker as such, e.g. by sending out an "I am here" signal. In this case, chipless RFID or other markers than RFID could be used as well, for instance materials with special magnetic properties or any other characteristic which allows to detect their presence. In another embodiment the RFID markers also carry other information either related or not to the fibres.

It is an object of the invention to provide an assembly of fibres for concrete and one or more RFID markers, wherein said RFID markers carry information about said fibres.

Depending on the use, the assembly may comprise one or more RFID markers. One marker may be enough to detect e.g. the assembly as such or to identify a certain kind of information in the assembly. More than one RFID marker or other type of marker may be needed e.g. to detect amounts or distributions of fibers.

RFID markers typically function at high (e.g. 13.56-MHz) and ultrahigh (e.g. 856- to 960-MHz) frequencies. Other tags or markers may use low frequency (e.g. 132 kHz) and have a read range which is much wider, e.g. a read area of 100 feet by 100 feet. Other suitable markers may comprise magnetic materials, substances with special magnetic properties (e.g. soft magnetics), chemically treated substrates etc. . . .

RFID markers in the assembly of the invention, to be added to a concrete or concrete structure, may store any type of information related to the concrete, but particularly related to the reinforcing fibres. Examples include but are not limited to product identification, length L, diameter D, L/D, origin and type.

RFID markers in the assembly of the invention may also store a "check sum" information or meta-data about the assembly of RFID markers. By that it can be verified if all markers that should be in the concrete actually passed. Information about the markers may be stored in a separate "check sum" marker or in the network. Meta-data provides information about possible missing or damaged RFID markers.

RFID markers of the invention may also store any type of information not related to the reinforcing fibres, e.g. related to the concrete structure as a whole, or related to any other aspect of the construction such as logistics, manufacturing or any other type of information.

RFID markers according to the invention may further carry the same or different information. An assembly according to the invention may comprise e.g. some RFID markers carrying the same information, and one or more markers carrying different information.

RFID markers may store one or more types of information on the same marker.

The present invention allows for the use of the simplest and cheapest RFID markers, carrying only "on/off" information. It is the position/distribution of said markers that provides information about the reinforced concrete, and this in relation to the (distribution of) reinforced fibres. Any other type of marker than RFID may be used as well to provide this simple functionality.

In one embodiment the assembly of the invention comprises RFID markers having the same L/D ratio as the fibres. As such the distribution of RFID markers is a good measure for the distribution of fibres, since the markers will be dispersed in the concrete in a similar manner as the fibres. In another embodiment the assembly of the invention comprises RFID markers having a different shape as the fibres.

In a preferred embodiment of the invention, the RFID marker has the same or similar length over diameter (L/D) ratio as the fibres or a collection of fibres. An acceptable ratio of similarity is within 10 to 20%. The reason can be explained as follows. It is known in the art that the L/D ratio of a fibre is an important parameter influencing the distribution of fibres in concrete. By having an RFID marker with the same L/D ratio as the fibres, the RFID markers will spread in the same way as the fibres in the concrete so that determining the position of the RFID markers in concrete will give information about the positioning of the fibres in concrete.

In one embodiment of the invention a predefined amount and type of reinforcing fibres further comprises one or more predefined amount and type of RFID markers. The amount and/or type of RFID markers may hereby be an indicator of the amount and/or type of fibres. In one embodiment of the invention the amount of one or more of said RFID markers is in proportion to the amount of said fibres.

RFID markers may also store any type of information related to an assembly or package of fibres and markers, whereby typically one RFID marker may identify the package of fibres or a certain amount of RFID markers may identify a certain amount or type of fibres.

RFID markers in the assembly may be fixed or attached to one or more fibres, or they may be added separately from the fibres to the assembly. RFID markers may also be grouped together in a package and added as such to the assembly.

In one embodiment it could be possible that the assembly only becomes as such an assembly when already in the concrete mix. First the fibres could be added and during or after that the appropriate RFID markers, as long as the "logical" assembly of fibres and RFID markers has been established.

Markers, especially tags, could also be printed on fibres directly, or it could be printed on the assembly as such.

The assembly may comprise identical fibres, or it may comprise different types of fibres. The assembly may comprise identical RFID markers, or it may comprise different types of markers. In one example different RFID markers could be added to identify the different types of fibres in the assembly.

RFID markers may also be distributed into the fibres by weight, e.g. one or two or three or more markers per kilo fibres.

Other examples of fibres and markers are given hereafter.

In one example, every fibre or type of fibre comprises an RFID marker identifying the fibre.

In another example every subpackage of fibres comprises one or more RFID markers identifying the subpackage. A subpackage could be a set of fibres glued together, as in patent U.S. Pat. No. 4,284,667 of the applicant. An RFID marker could also be glued in the subpackage or printed on it.

In another example a subpackage could be a single sac in a chained package of fibres, as in patent application U.S. Pat. No. 6,945,686 A1 by the applicant.

In yet another example, one or more RFID markers may be packed together with the fibres in a same sac, or they may be packed in a different sac of the chain package, at regular intervals within the chain. The RFID markers would then identify the fibres in the preceding or following package(s) between the intervals.

In case of disposable fibre packing material, the RFID markers could also be attached or printed to the disposable packing material.

It is obvious to the skilled person that there are multiple examples of how to relate one or more RFID markers to one or more fibres and as such form an assembly.

RFID markers or tags are only one example of markers suited for the method of the invention. In another example transponders may be used instead of RFID markers for the same purpose. Other examples include any type of marker which is suitable to provide the information "I am here" or "I am here and I know who I am" towards a detection device.

The RFID markers of the invention may have different shapes.

The RFID transponder of the invention may be packaged in many different ways into an RFID marker. In one example it can be mounted on a substrate to create a tag. In another example it can be sandwiched between an adhesive layer and a paper label to create a printable RFID label, or smart label. Transponders can also be embedded in a plastic card or special packaging to resist heat, cold or harsh conditions.

For the purpose of the method of the invention, the RFID marker should be suited to survive in a concrete environment. RFID markers according to the invention are preferably resistant to an alkaline environment and high mechanic impact during mixing, pumping and placing.

The assembly of the invention may be packed in a bag, a box, a chain package, a wrap, a glue or any other means to hold the fibres and RFID markers together.

Typically the assembly may be packed in big bags or big boxes of 1100 kg steel fibres.

Another packaging provides for water soluble or non-water soluble middle-sized bags of 20 kg.

Small bags of 100 g until 2 kg may be used. These small bags may be isolated or may form a chain packaging.

RFID markers and readers are available in different frequencies. RFID markers of the invention may use low, high, ultra-high, and microwave or other frequencies depending on the circumstances and application.

The assembly according to the invention may comprise RFID markers having the same or different frequencies.

Practical read distances for the methods of the invention range from about a few centimeter up to a few meters depending on the chosen radio frequency and antenna design or size.

It is also an object of the invention to provide a concrete or concrete structure comprising an assembly of fibres or distributed concrete reinforcement structures and one or more RFID markers as described above.

In one example the steel fibre concentration in concrete is in the range of 10 kg/m$^3$ and more.

A further object of the invention is to provide a method for manufacturing said concrete structure by integrating or mixing an assembly of fibres and one or more RFID markers in the concrete structure.

The term "concrete or concrete structure" means any state of concrete, comprising but not limited to e.g dry composition or part of composition, wet, pre-mixed, pre-cast, cast, hardened, broken out, damaged, exploded, earthquaked, or any piece of concrete in any state or condition. These may be found e.g. on a construction site, in a factory, at a distribution or manufacturing centre, in a mixing truck, in a concrete building, road or bridge.

A primary object of the invention is to provide a method for determining the amount of fibres for concrete, said method comprising the steps of a) providing an assembly as set out above, wherein the amount of RFID markers is in proportion to the amount of fibres; b) providing a reader device for reading said RFID markers; c) counting the amount of RFID markers; and d) proportioning backwards said amount to determine the amount of fibres.

Another object of the invention is to provide a method for determining the quality or content of fibres for concrete, said method comprising the steps of a) providing an assembly as set out above, wherein the RFID markers carry information about the fibres; b) providing a reader device for reading the information on said RFID markers; c) interpreting the information of RFID markers on content and/or quality.

The method of the invention describes an automated way of dosing the exact amount (quantity) and content (quality) of fibres needed for manufacturing a fibre concrete.

In a particularly preferred embodiment the methods of the invention involve determining the amount and distribution of concrete while unloading a concrete truck.

In one example the method of the invention may work as follows. When the assembly of fibres and RFID markers pass e.g. the chute of a mixer the information on the RFID markers is read by a reading device, and/or the RFID markers passing the device can be counted. This could be a device which is installed at the chute of the truck mixer. A computer device can interpret when the exact amount and type of fibres have passed the chute by interpreting the information read from the RFID markers, by which the chute of the mixer is then lifted to stop the supply of fibres being added to the mixer. The reading device can also read some packages of fibres comprising RFID markers before mixing these with the concrete, hereby determining the exact amount of packages to be added for mixing. Reading can either be integrated in the mixing process, or it can be done standalone before the action of mixing, depending on the intelligence and complexity of the reading device.

Other examples according to the invention may include but are not limited to reader devices on conveyor belts, hoses, pipes, pumps.

The assembly of fibres and RFID markers may also involve separate supplies of fibres and RFID markers either or not related to each other.

In one example, the total amount of fibres which has been dosed to a preferably known volume of concrete can be determined by reading and interpreting the number of marker counts and the number of markers per kg of fibres. In another example, measuring the time difference between each marker count will allow to make information about fiber distribution available. This may be used, for instance, when unloading the concrete mixer (e.g. central mixer or truck mixer) into a transportation device or when the concrete is poured from the transportation device or directly from a mixer or truck mixer. In case of non-constant unloading speed, the measured time difference between two markers can be adjusted by knowing the actual volume flow. Volume flow may, for instance, be measured directly or be concluded from the number of drum rotations of the mixer per time unit.

The computer device may work either standalone or integrated in the reading device. The computer device may have just a reading function, e.g. read the amount of fibres that have passed; or it may have a more intelligent data processing functionality in that it e.g. can visualise, calculate and correlate amount and distribution of fibres needed for a given amount of concrete. The computer device may further also read and/or interprete information carried on RFID markers. The computer device can be located on the building or manufacturing site, or it can be offsite and linked via the internet or any other network. The computer device may also receive or transmit information from/to sensors or actuators which are not an integral part of the computer device. Such sensors might be needed e.g. to detect the rotation speed of the drum when the truck is unloaded so that the volume flow can be determined.

The computer device may also link information carried on RFID markers to the internet or databases, so that the data can be used to create business value or to extract further information not stored on the markers. The customer can e.g. consult fibre type and construction recommendations, while the fibre manufacturer can e.g. check the content and origin of a certain fibre concrete comprising the RFID markers.

When mixed with concrete or mortar, the mixture of fibres and the concrete or mortar comprises said RFID markers in a dispersed manner, in the same or similar way as the fibres are dispersed or distributed in the concrete or mortar.

An inherent advantage of the method of the invention is that once mixed and submerged into the concrete or mortar (the presence of) the reinforcing fibres can still be identified. Examples include but are not limited to type of fibres, origin and distribution of fibres within the concrete.

The degree of identification depends on the information carried by the RFID markers. In one example full traceability of the fibres could be provided by storing e.g. information about production date, production line and any other information needed to fully trace a fibre in the manufacturing or logistics process.

RFID technology allows to read a marker through the packaging or the product itself. The marker can be read independently of the orientation of the marker. These are two major advantages over barcode labeling.

Once the fibres and the RFID markers are within the concrete, the markers may serve other purposes as set out hereunder in further methods of the invention.

Accordingly, it is a further object of the invention to provide a method for determining the amount of fibres in a concrete or concrete structure, said method comprising the steps of: a) providing a concrete or concrete structure comprising an assembly of fibres and one or more RFID markers, wherein the amount of said RFID markers is indicative of or in proportion to the amount of said fibres; b) providing a reader device for reading the RFID markers in said concrete structure; c) counting the amount of RFID markers; and d) proportioning backwards said amount to determine the amount of said fibres.

Another object of the invention is to provide a method for identifying the fibres in a concrete or concrete structure, said method comprising the steps of: a) providing a concrete or concrete structure comprising an assembly of fibres and one or more RFID markers, wherein said RFID markers carry information about said fibres; b) providing a reader device for reading the information on one or more of said RFID markers in said concrete structure; and c) identifying said fibres on the basis of said information.

A further object of the invention is to provide a method for determining the distribution of fibres in a concrete structure, said method comprising the steps of: a) providing a concrete or concrete structure comprising an assembly of fibres and one or more RFID markers, wherein the amount of said RFID markers is indicative of or in proportion to the amount of said fibres; b) providing a reader device for reading the RFID markers in said concrete structure; c) determining the distribution of RFID markers; and d) proportioning backwards said distribution to determine the distribution of fibres.

A variant of the method according to the invention for determining the distribution of fibres in a concrete or concrete structure is a method comprising the steps of: a) providing a concrete or concrete structure comprising an assembly of fibres and one or more RFID markers, wherein said RFID markers carry information about said fibres; b) providing a reader device for reading the information on one or more of said RFID markers in said concrete structure; c) determining the distribution of RFID markers; and d) determining the distribution of fibres based on the information and distribution of RFID markers.

The previous two methods may further comprise a computer device for visualising the location of each RFID marker within said concrete structure.

Still a further object of the invention is to provide a method for determining the origin of fibres within a concrete or concrete structure, said method comprising the steps of: a) providing a concrete or concrete structure comprising an assembly of fibres and one or more RFID markers, wherein at least one of said RFID markers carry information about the origin of said fibres; and b) providing a reader device for reading said origin information.

Yet another object of the invention is to provide a method for determining the type of fibres within a concrete or concrete structure, said method comprising the following steps: a) providing a concrete or concrete structure comprising an assembly of fibres and one or more RFID markers, wherein at least one of said RFID markers carry information about the type of said fibres; and b) providing a reader device for reading said type information.

The methods according to the invention as described above allow for advanced quality control and non-destructive testing of fibres for concrete and fibre concrete. In one example the RFID markers could be printed onto or attached to each fibre, allowing for an exact determination of the distribution or content of the fibres within the concrete. Computer visualisation can represent the exact place of every RFID marker/fibre within the concrete.

DESCRIPTION OF DRAWINGS

By way of example some embodiments of the invention are described by the accompanying figures and drawings.

FIG. 1 shows an RFID marker 10 with the same or similar L/D ratio as a fibre 12. The RFID marker and the fibre have a very similar shape to allow similar distribution or dispersion of the RFID markers and the fibres. In this way the distribution of the RFID markers is an objective measure for the distribution of the fibres.

FIG. 2a shows another shape RFID marker 14 with the same L/D ratio as the glued fibres 16 shown on FIG. 2b.

FIG. 3 shows a concrete mixer 18 having a reader device 20 to read the passing assemblies of RFID markers 10 and fibres 12.

FIG. 4 shows a concrete structure 22 comprising fibres 12 and RFID markers 10. A reader device 20 reads the RFID marker information and a computer device 24 interprets the data.

FIG. 5 shows a chain package as sold by the applicant whereby each subpackage 26 comprises fibres 12 and an RFID marker 10.

Figure 6:
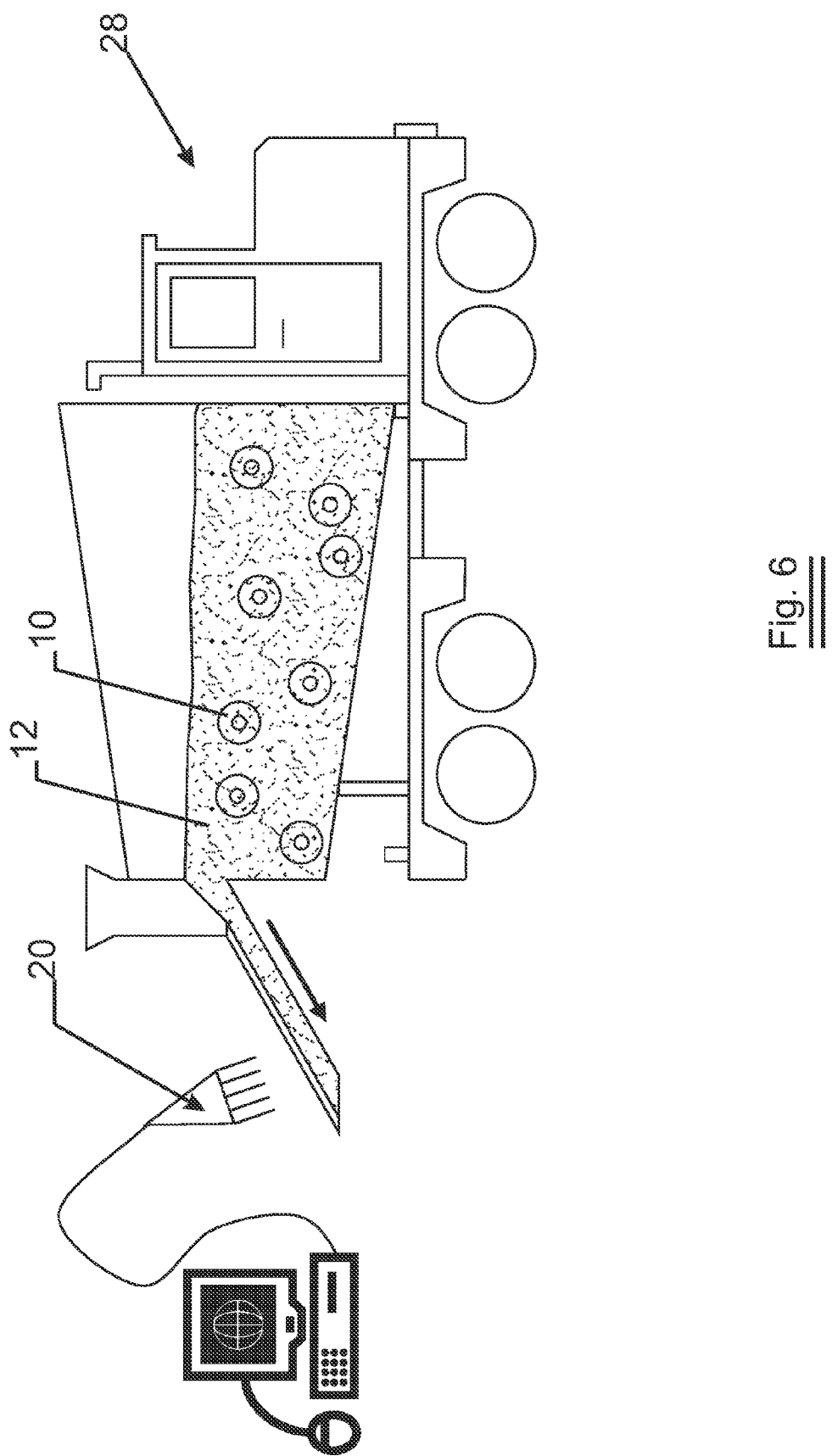
FIG. 6 shows the unloading of concrete from a truck 28. A reader device 20 detects the content within the concrete, i.e. the passing assemblies of RFID markers 10 and fibres 12 within the concrete. The reader device, suitable for reading RFID markers or any other suitable markers, can also determine the amount and distribution of fibres within the concrete.

The invention claimed is:

1. A method for determining an amount of fibres for concrete, in concrete, or in a concrete structure, said method comprising the steps of:
   a. providing an assembly comprising a plurality of concrete reinforcement fibres and one or more RFID markers, wherein an amount of said one or more RFID markers is indicative of an amount of said concrete reinforcement fibres;
   b. providing a reader device configured to read said one or more RFID markers;
   c. determining the amount of said one or more RFID markers; and
   d. determining the amount of said concrete reinforcement fibres based at least on the determined amount of said one or more RFID markers and a known relationship of the amount of said one or more RFID markers to the amount of said concrete reinforcement fibres.

2. The method according to claim 1, wherein:
   said concrete reinforcement fibres and said one or more RFID markers are disposed in a concrete or in a concrete structure, and
   said reader device is configured to read said one or more RFID markers while said one or more RFID markers are disposed in said concrete or in said concrete structure.

3. The method according to claim 1, wherein said one or more RFID markers comprise information about said concrete reinforcement fibres.

4. The method according to claim 1, wherein said one or more RFID markers have a length to diameter ratio that is within 20% of a length to diameter ratio of said concrete reinforcement fibres.

5. The method according to claim 1, wherein said concrete reinforcement fibres are steel reinforcement fibres, non-steel reinforcement fibres, or a combination of steel reinforcement fibres and non-steel reinforcement fibres.

6. The method according to claim 1, wherein:
   said assembly comprises a plurality of said RFID markers, and
   each of said RFID markers comprises the same or different information.

7. The method according to claim 1, wherein said one or more RFID markers comprise information about said concrete reinforcement fibres, the information comprising one or more types of information selected from the group consisting of (i) information relating to an origin of said reinforcement fibres, (ii) information relating to product identification of said reinforcement fibres, (iii) information relating to a diameter of said reinforcement fibres, (iv) information relating to a length of said reinforcement fibres, (v) information relating to a length to diameter ratio of said reinforcement fibres, and (vi) information relating to a type of said reinforcement fibres.

8. The method according to claim 1, wherein said one or more RFID markers have the same or different frequencies.

9. The method according to claim 1, wherein said assembly is packed in a bag, a box, a chain package, a wrap or with a glue to hold said concrete reinforcement fibres and said one or more RFID markers together.

10. A method for determining a distribution of concrete reinforcement fibres in concrete or in a concrete structure, said method comprising the steps of:
   a. providing a concrete or a concrete structure, said concrete or said concrete structure comprising a plurality of concrete reinforcement fibres and one or more RFID markers, wherein an amount of said RFID markers is in a known relationship to an amount of said concrete reinforcement fibres;
   b. providing a reader device configured to read said one or more RFID markers in said concrete or concrete structure;
   c. determining a distribution of said one or more RFID markers; and
   d. determining the distribution of said concrete reinforcement fibres based at least on the distribution of said one or more RFID markers and the known relationship of the amount of said one or more RFID markers to the amount of said concrete reinforcement fibres.

11. The method according to claim 10, wherein said one or more RFID markers comprise information about said concrete reinforcement fibres.

12. The method according to claim 10, wherein said one or more RFID markers have a length to diameter ratio that is within 20% of a length to diameter ratio of said concrete reinforcement fibres.

13. The method according to claim 10, wherein said concrete reinforcement fibres are steel reinforcement fibres, non-steel reinforcement fibres, or a combination of steel reinforcement fibres and non-steel reinforcement fibres.

14. The method according to claim 10, wherein:
   said concrete or concrete structure comprises a plurality of said RFID markers, and
   each of said markers comprises the same or different information.

15. The method according to claim 10, wherein said one or more RFID markers comprise information about said concrete reinforcement fibres, the information comprising one or more types of information selected from the group consisting of (i) information relating to an origin of said reinforcement fibres, (ii) information relating to product identification of said reinforcement fibres, (iii) information relating to a diameter of said reinforcement fibres, (iv) information relating to a length of said reinforcement fibres, (v) information relating to a length to diameter ratio of said reinforcement fibres, and (vi) information relating to a type of said reinforcement fibres.

16. The method according to claim 10, wherein said one or more RFID markers have the same or different frequencies.

17. A method for determining the amount of fibres for or in concrete, said method comprising the steps of:
   a. providing an assembly comprising a plurality of concrete reinforcement fibres and one or more markers whose presence is detectable in the assembly, wherein an amount of said markers is in a known relationship to an amount of said concrete reinforcement fibres;
   b. providing a reader device for reading said one or more markers;
   c. counting the amount of said one or more markers; and
   d. proportioning backwards to determine the amount of said fibres.

18. An assembly comprising:
   a plurality of concrete reinforcement fibres; and
   one or more markers whose presence in the assembly is detectable,
   wherein said one or more markers have a length to diameter ratio that is within 20% of a length to diameter ratio of said concrete reinforcement fibres.

* * * * *